United States Patent [19]

Griffin

[11] Patent Number: 4,662,727
[45] Date of Patent: May 5, 1987

[54] TWO-AXIS OPTICAL INERTIAL SYSTEM USING A GYRO ROTOR AS A STABLE REFERENCE

[75] Inventor: William S. Griffin, Manhattan Beach, Calif.

[73] Assignee: Hughes Aircraft Company, Los Angeles, Calif.

[21] Appl. No.: 518,982

[22] Filed: Aug. 1, 1983

[51] Int. Cl.⁴ .................. G02B 27/64; G01C 1/00
[52] U.S. Cl. .................................. 350/500; 356/149; 356/152
[58] Field of Search ............... 350/500; 356/138, 141, 356/143, 149, 152–153, 148; 33/230, 236, 275 G, 318; 74/5.22; 250/201; 244/3.16

[56] References Cited

U.S. PATENT DOCUMENTS

| | | | |
|---|---|---|---|
| 2,432,613 | 12/1947 | Fedde | 33/230 |
| 3,326,619 | 6/1967 | Johnson et al. | 33/236 |
| 3,522,993 | 8/1970 | Gabriet | 33/236 |
| 3,684,383 | 8/1972 | Johansson | 356/152 |
| 3,989,942 | 11/1976 | Waddoups | 356/152 |
| 4,108,551 | 8/1978 | Weber | 250/333 |
| 4,144,505 | 3/1979 | Angelbeck et al. | 356/152 |
| 4,173,414 | 11/1979 | Vauchy et al. | 356/149 |
| 4,270,044 | 5/1981 | Elwell, Jr. | 250/201 |
| 4,326,800 | 4/1982 | Fitts | 356/152 |

FOREIGN PATENT DOCUMENTS 1015916 1/1966 United Kingdom ............... 350/500

Primary Examiner—William H. Punter
Attorney, Agent, or Firm—L. B. Sternfels; A. W. Karambelas

[57] ABSTRACT

The present invention provides a two-axis optical inertial reference system wherein the rotor (12) of a gyro (10) is utilized as a stable reference. A surface (19) of the rotor is made reflective. Sighting on the reference is provided through a window (18) in the gyro case, (16) to access rotor reflective surface (19) the gyro case being hard mounted to a moving surface in the coarse gimbal of the system, since the gyro rotor has a finite angle of travel with respect to the case. A stabilized inertial platform (gyro rotor (12)) is achieved without the need of intermediate servoed gimbals. The gyro torquers are used to precess the rotor's spin axis to provide a means for slewing the spin axis and, hence, the optical system's line-of-sight (60) to the desired direction of the optical system. Specific embodiments for obtaining the required reference beam are disclosed.

12 Claims, 8 Drawing Figures

TWO-AXIS OPTICAL INERTIAL SYSTEM USING A GYRO ROTOR AS A STABLE REFERENCE

BACKGROUND OF THE INVENTION

1. Field of Invention

The present invention relates to line-of-sight (LOS) control systems and, more particularly, to a two-axis optical inertial reference system wherein the rotor of a two degree of freedom gyro is utilized to provide a stable line-of-sight reference beam.

2. Description of the Prior Art

Line-of-sight systems have been widely used in the prior art for controlling the alignment of an operating mechanism along an operating axis. For example, a gun may have its boresight aligned with a desired target in accordance with the optical axis of a telescope, used by the observer for observing a desired target with respect to an orthogonal set of axes which intersect at the optical axis in a reticle attached to the telescope. The gun is typically mounted on a tank, aircraft or ship, which is subject to spurious motions relative to the line-of-sight. The motions tend to blur the position of the target as viewed by the observer.

Another example is stabilization of line-of-sight of Forward Looking Infrared (FLIR) or TV viewing systems. These systems are typically mounted on moving platforms such as helicopters, aircraft, tanks, trucks, and fighting vehicles. Motion of the vehicles and vibration of the vehicles disturb the optical system's line-of-sight (LOS). Such disturbances to the optical line-of-sight cause the viewing systems' images to become blurred and unuseable.

Conventional practice in achieving stabilized line-of-sight control is to (1) fabricate the device of expensive, high performance components, (2) use an extra set of fine, vernier gimbals on which the optical equipment is mounted, or (3) develop a separate, gimbaled platform which generates a stable reference beam to which the line-of-sight of the main optical system (tank sight, FLIR) is slaved.

Each of these conventional methods for achieving increased LOS stability has its disadvantages. Use of more expensive, higher performance components quickly drives the system's cost to impractical values. Even given such components, effects such as bearing seal friction, cable wraps, and base motion may still cause unacceptable LOS jitter. Use of a second set of fine gimbals will produce dramatic increases in LOS stability but at a price of approximately double or more than that of the original gimballed system. Furthermore, system size and weight are usually more than doubled.

Use of a separate, gimballed (usually a four gimbal system) stable optical reference will provide the highest degree of line-of-sight stabilization achievable with present state of the art. The separate optical reference may be used in either of two ways: as a light source (a stable light source is mounted on the platform) or as a stable reference flat (a flat is mounted on the platform). In the first implementation, a reference light beam from the separate stable platform is directed through the optical train of the optical system whose LOS is to be stabilized. An angle detector in that system's optical train detects motion of the reference beam and causes a beam steering mirror in the optical train to move so that the optical system's LOS is stabilized.

In the other implementation, a light source is located in the optical train of the system whose LOS is to be stabilized. The light source is propagated through the optical train and reflected off the flat mounted on the stable platform. The returned beam is sensed by an angle sensor mounted proximally to the light source. Jitter of the return beam at the angle sensor indicates that the components of the optical train are moving. This jitter is sensed by the angle sensor and an electrical signal is generated which again causes a beam steering mirror to move so as to stabilize the optical train's line-of-sight.

Although the stabilized platform, when incorporated into an overall autoalignment system, increases the accuracy to which a line-of-sight may be stabilized, such a platform is relatively heavy, costly, consumes large amounts of electric power, requires large volumes or as otherwise bulky and tends to be sensitive to environmental vibration.

The following patents are typical of prior art line-of-sight systems which utilize stable platforms for alignment control. U.S. Pat. No. 4,108,551 to Weber discloses a periscopic apparatus having a stabilized gunsight head positioned externally of a vehicle and a sight tube within the vehicle, and a stabilization gyroscope is provided within the gunsight head to stabilize a reflecting mirror and to pivot a casing containing the mirror for bearing purposes by causing a precession of the gyroscope about an appropriate axis. U.S. Pat. No. 3,853,405 to Adler et al describes a radiant energy device for indicating when a predetermined axis is in line with a source of radiant energy, and a telescope arrangement used on the device and mounted with a set of gimbals to make the telescope insensitive to movements of a missile incorporating the device. U.S. Pat. No. 3,997,762 to Ritchie et al discloses a tank fire control system which includes a sighting device and associated drive mechanism and a gun having an associated drive mechanism, with the gun and sighting drive mechanisms being independent, and utilizing a gyro reference signal for alignment purposes. U.S. Pat. No. 4,062,126 to O'Hara et al provides a system which prevents the dislocation of a target-sight element by utilizing a pair of gyroscopes, the gyroscopes each including stabilized platforms which control the element positions. U.S. Pat. No. 3,723,005 to Smith et al discloses a visual sighting apparatus which utilizes a laser generated aiming device, a gimballed mirror, and a computer which responds to rate tracking and range signals from gyro sensors and the laser aiming device to properly position the gimballed mirror. U.S. Pat. No. 4,027,540 to Allard discusses an inertial optical stabilizer wherein the inner gimbal supports the gyro rotor and a mirror diagonal with a clearance window to admit light. U.S. Pat. No. 3,415,157 to Marchisio et al discloses a gun alignment system having a telescopic seeker gimballed for two degrees of motion with respect to a vehicle and rate gyros coupled to the telescope to provide error signals indicating displacement of the telescope from an inertial reference axis, the error signals being utilized both to stabilize the target image in response to spurious motions and to maintain the gun boresight aligned with respect to the inertial reference axis.

Typical other types of line-of-sight alignment systems include the following patents. U.S. Pat. No. 4,020,739 Piotrowski et al discloses a fire control system having a flat mirror mounted to the muzzle of a gun to be aimed, and a light source directing a beam of light onto a moveable mirror which reflects the beam normal to the muzzle mirror only in the absence of gun to periscope positioning errors for all positions of the gun. The reflected beam from the muzzle mirror is detected and error signals are provided which are utilized to position a movable vehicle in a gunner's periscope for enabling the gunner to aim the gun accurately. U.S. Pat. No. 3,918,813 to Rossiter describes an optical viewing alignment system which utilizes a beam splitting cube in the optical system, with the face of the cube opposite the collimator being reflective. U.S. Pat. No. 4,142,799 to Barton discloses a gyro rotor for compensating for gun sighting errors due to misalignment between the gun muzzle axis and the optical axis of an associated gun sighting system and utilizes a reflector fixed to the muzzle portion of the gun barrel. U.S. Pat. No. 4,246,705 to Lee discloses a laser based weapon simulator system for determining the hit/miss occurrences during simulated firing of the weapon.

What is desired, therefore, is to provide a line-of-sight alignment system which incorporates the advantages of gyroscope stabilized platforms (i.e., high accuracy and stability) without their attendant disadvantages. These disadvantages are typically high cost, increased power consumption, increased weight, large volume, and the servo errors which are normally associated with complex control systems.

SUMMARY OF THE INVENTION

The present invention provides a two-axis optical inertial reference line-of-sight system wherein the surface of the rotor of a two degree of freedom gyro, a mirror mounted to the rotor surface, or a reference source mounted on the rotor is utilized as a stable optical reference. Sighting on the reference is accomplished by viewing it through a window in the gyro's case. Since the rotor of the gyro reference has a finite angle of travel with respect to the case, the gyro case is hard mounted to a moving surface, typically the coarse gimbal of an electro-optical pointer-tracker. An inner, stabilized inertial platform (the gyro rotor) is thus obtained without the necessity of external servoed gimbals since the gyro rotor, due to its own inertia, wants to point in one steady direction. The gyro torquers are used to precess the spin axis of the rotor. This provides a means for slewing the rotor's spin axis and, hence, the optical system's line-of-sight to the desired direction.

In a first embodiment, a stable reference beam is obtained to which the remainder of an external optical system is slaved. A gyro is mounted in close proximity to a periscope/beamsplitter, an alignment laser/steering mirror combination, an angle detector, a corner cube, and a light modulator. An alignment beam is generated by the laser, and the beam is split by the lower half of the periscope/beamsplitter. Roughly one-half of the beam is sent to the top half of the periscope/beamsplitter whereat the beam is again split, approximately one-half being directed to the gyro rotor from which it is reflected. Upon reentering the periscope beamsplitter, the beam is again split, and one-half of the remainder emanates as the output, reference line-of-sight (LOS) beam. The outer portion of the return beam is returned through the periscope where it passes through the lower beamsplitter and is imaged on the angle detector. Means are provided for maintaining the output LOS beam normal to the surface of the gyro rotor.

A second embodiment provides a stable reference flat (gyro rotor) in an optical system from which an autoalignment beam may be reflected, thus providing a stable reference beam to which the system line-of-sight may be referenced. An alignment source and angle detector are mounted in close proximity at one end of the system optical path. The reference flat is stabilized in output space at the other end of the optical train. The alignment beam is sent through the system optical path, reflected off the stable reference flat and returned to the detector. The source beam is also sampled at the source and imaged on the detector so that it may be compared against that returned from the stable flat. Misalignment of the two beams at the detector indicates that the autoalignment beam is not normal to the flat. The angle of the steering mirror is corrected to bring the two spots into coincidence.

Since the use of the gyro rotor to provide a stable line-of-sight does not require a pair of gimbals (with the associated drive, electronics and cabling), the device of the present invention is physically smaller and lighter than previous stabilized platforms. Obviously, incorporating the device of the present invention as part of an overall larger system makes the larger system smaller and lighter. Since the number of components required is reduced, cost savings are also realized. The present invention also minimizes servo errors associated with normal two-axis platform approach, and the small size, low weight features of the device make it practical to be used in systems which were heretofore impractical. A further advantage of the concept is that increased accuracies are realized because the errors and dynamic response of the servos, which normally drive the gimbals of a conventional platform, are eliminated.

The advantages of the present invention over conventional, two gimbal stabilized platforms are significant. No additional mechanical or electrical components are added in order both to achieve the required stabilized optical reference and to make the device much simpler than the conventional stabilized platform. Because of the small size and inherent ruggedness of most two degree of freedom dry tuned gyros, the preferred type of gyro used in the present invention, the device can provide a stabilized optical reference in many areas for which conventional stabilized platforms are now impractical.

The use of the gyro rotor, as the stable optical reference, or stabilized platform, in accordance with the teachings of the present invention, enables a stabilized reference beam to be provided to offer significant improvements in overall system weight, volume and complexity. Further, the specific servo control feature of the present invention allows the system components to be flexibly, instead of rigidly, mounted, thus further reducing system costs.

BRIEF DESCRIPTION OF THE DRAWINGS

For a better understanding of the invention as well as other objects and further features thereof, reference is made to the following description which is to be read in conjunction with the accompanying drawings wherein:

FIG. 5a is an optical schematic of a second embodiment of the present invention utilizing a two degree of freedom gyro with a flat on the gyro rotor, with FIG. 5b depicting an enlargement of a gyroscope portion of FIG. 5a;

The same reference numerals identify identical components in each of the figures.

DETAILED DESCRIPTION OF THE INVENTION

Figure 1:
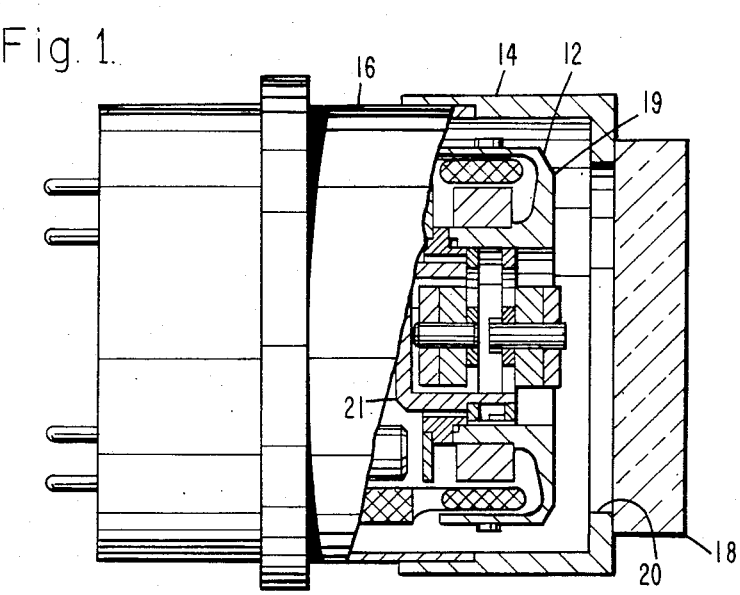
FIG. 1 is a partial sectional view of a two degree of freedom gyro modified in accordance with the teachings of the present invention.

Referring now to FIG. 1, a partial sectional view of a gyro 10 utilized in the present invention is illustrated. In the preferred embodiment, gyro 10 comprises a modified two degree of freedom gyro such as the dry tuned gyro manufactured and sold under the trademark Conex by Kearfott, a division of the Singer Company, Little Falls, N.J., although similarly configured gyros may be utilized. The Conex gyro includes a gyro rotor 12 which comprises a high-permeability magnetic return path. Separate torquer electromagnets mounted on the gyro's case provide the magnetic fields which attract the rotor and cause it to precess to the desired pointing direction. A surface 19 on the rotor is polished or otherwise provided with a reflective finish. A gimballing suspension system connects the rotor to one end of its motor shaft which, in turn, is secured to a motor 21, and provides angular freedom about the two perpendicular axes.

Gyro 10 is modified by soldering or otherwise affixing an extension 14 to an existing gyro case 16. An opening 20 is formed on the extension and a clear window 18 is secured thereto using conventional bonding techniques. Opening 20 and window 18 provide optical access to reflective surface 19 on rotor 12. Although the modification described is for the Conex gyro, similar modifications can be made to other models or other manufacturers' gyros to enable the gyro rotor to be accessible to an incident light beam. Although it is preferred that surface 19 of the rotor be utilized as the reference flat to provide the stable optical reference beam, alternative configurations may be utilized, such as a mirror secured to the rotor surface or a reference source, such as a LED, mounted on the rotor.

Figure 2:
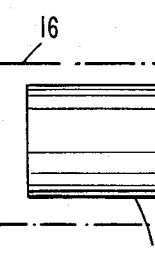
FIG. 2 is a simplified optical schematic for obtaining a stable reference beam in accordance with a first embodiment of the present invention.
Figure 2:
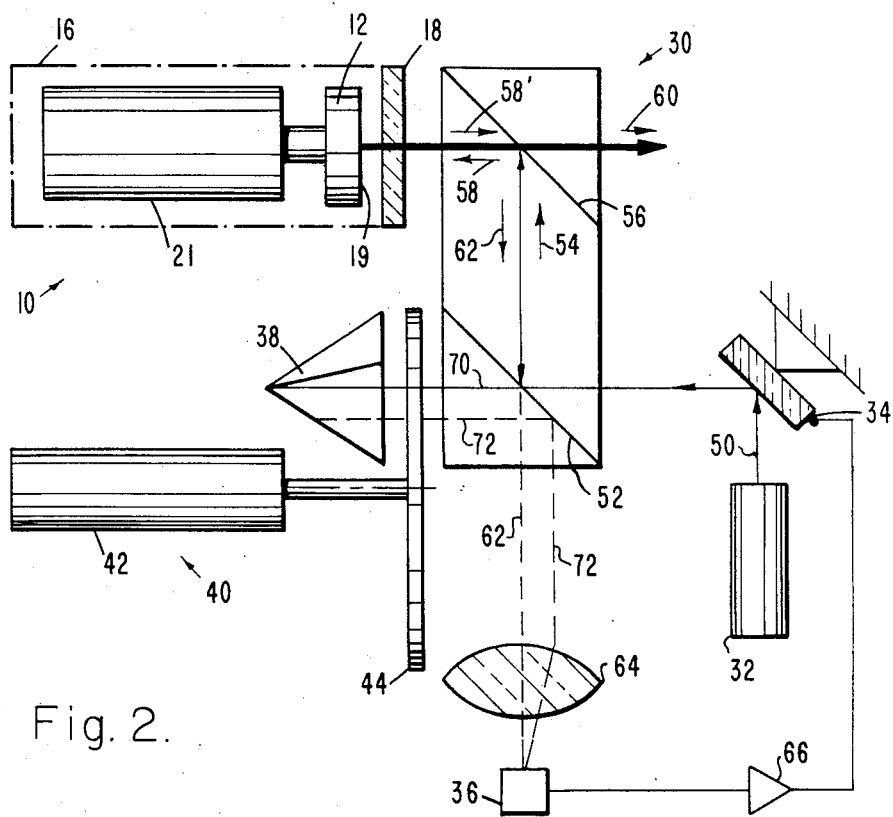

FIG. 2 illustrates a simplified optical schematic of a first embodiment of the invention for obtaining the required stable reference beam to which a main beam is to be stabilized. It should be noted at this point that rotor 12 is maintained in a substantially fixed position. Case 16, on the other hand, is hard mounted to a moving member such as a gun turret. Displacement errors between the gyro's rotor and its case are used to generate an electrical error signal. This error signal is used to drive a servo system which drives the gun turret. The gun turret is thus forced to point to the same direction that the gyro's rotor is pointed.

In this embodiment, gyro 10 is mounted in close proximity to a periscope type beamsplitter 30, an alignment laser 32, a beam steering mirror 34, a detector comprising a lens 64 and a photoelectric sensor 36, a corner cube 38 and a modulator 40. Beamsplitter 30 includes lower and upper beamsplitter surfaces 52 and 56 respectively. In the embodiment illustrated, modulater 40 comprises a conventional spin motor 42 and a chopping wheel 44 mounted on spin motor 42. Other techniques may be utilized for modulating a light beam, including the use of electrooptic modulators. Laser 32 may typically comprise a helium-neon laser emitting a light beam 50 having a wavelength of 6322 Å.

In operation, beam 50 is reflected by beam steering mirror 34 to the lower portion of periscope 30 and to beamsplitter 52, where approximately one-half of the beam is directed as beam 54 to the upper half of periscope 30 wherein it is incident on beamsplitter 56. Beamsplitter 56 causes one-half of beam 54, designated by indicium 58, to pass through window 18 and to be incident on surface 19 of gyro rotor 12. Beam 58 is reflected by surface 19 and re-enters periscope 30 and is incident on beamsplitter 56. Beam 58 is split again, one-half of the beam emerging as output reference line-of-sight beam 60, and the other half being returned as beam 62 to beamsplitter 52. Beam 62 passes through beamsplitter 52 and is imaged by a lens 64 on detector 36. Detector 36 is conventional and generates an electrical signal whose magnitude is proportional either to the difference in linear position between the focused spot and an electrical null position or to the difference in linear positions of two light beams focused on the surface of detector 36. The electrical output of detector 36 is coupled to a servoamplifier 66, the output of which drives a beam steering mirror 34.

By detecting motion of return beam 62 away from an electrical null location on angle detector 36, error signals are generated which drive beam steering mirror 34 via the servo loop to the new rotor angular position within case 16. Further, although not illustrated, the servo loop arrangement is such that mirror 34 is capable of being driven in two orthogonal directions. Positioning of mirror 34 thus provides dynamic compensation to output reference beam 60, and would be all that is necessary for accurate system operation if laser 32, angle detector 36, beamsplitter 52 and lens 64 were rigidly mounted relative to each other. However, without the rigid mounting, further compensation is necessary because it would not be known whether output beam 60 was normal to the gyro rotor surface, which is the reference for the system line-of-sight, or whether some of the intermediate components were vibrating. Thus, if detector 36 should vibrate relative to rotor 12, detector 36 would command output beam 60 to follow it, and hence exhibit the same vibration angles. Similarly, any movements of laser 32, periscope 30, etc., will give false indications unless compensation is provided.

This problem is overcome by passing a portion 70 of beam 50 from alignment laser 32 through lower beamsplitter 52 to corner cube 38, and reflecting beam 70 back from the corner cube as a beam 72. Corner cube 38 acts in its conventional manner to reflect the light beam back in the same direction it comes from regardless of the angle of incidence. Beam 70 is then reflected from beamsplitter 52 to detector 36 by means of lens 64. A light modulator 40 between corner cube 38 and lower beamsplitter 52 modulates beam 72 so that it may be distinguished from beam 62 returned from gyro rotor 12. Detector 36 thus detects two focused light beams, or spots, one continuous wave (return beam 62 from the gyro rotor) and one modulated (beam 72 returned from corner cube 38). Mirror 34 is positioned by the servo loop until the spots are co-aligned. This occurs only when output reference beam 60 is normal to gyro rotor surface 19. The fact that coalignment of the two spots occurs only when output reference beam 60 is normal to the gyro rotor surface, which is dictated by the laws of geometrical optics. Thus, details thereof are not set forth herein.

In operation, the difference between the two beam spots imaged on angle detector 36 is used to drive beam steering mirror 34 to enable superimposition of the spots, so long as they lie anywhere in the field of view of the detector. The only requirement, from a reference beam stabilization standpoint, is that they be superimposed. Thus, angle detector 36 and laser 32 may have vibration with respect to the gyro rotor and not affect the stability of reference beam 60 provided that the servo loop driving the beam steering mirror responds sufficiently fast to compensate for the disturbing motions. Furthermore, periscope/beamsplitter 30 may have flexural motions, thus misaligning its reflecting surfaces, without affecting output beam stability. As set forth hereinabove, the only requirement is that the two spots on angle detector 36 be kept superimposed by motion of beam steering mirror 34. It is to be understood that, if every component shown in the optical schematic were rigidly attached, the aforementioned compensation would not be required.

This latter feature permits the use of lower quality components which do not have to be precisely aligned one to another and provide the following benefits. Cost reduction and design simplifications are achieved. Fabrication tolerances are relaxed. Sensitive components, such as detector 36 and periscope 30, may be soft mounted, e.g., by elastomeric isolator pads, instead of being rigidly mounted to a hard metal case. Thus, requirements on their environmental design requirements can be relaxed.

Because a spot imaged on detector 36 from rotor surface 19 is not modulated, problems may arise since such signals can drift and zero shift in servo systems. This problem can be eliminated by modulating laser 32 at a frequency different from that of chopping wheel 44. Typically, the laser modulation frequency is selected to be appreciably higher than that of the modulation of return beam 72 from corner cube 38 as provided by the frequency determined by the chopping wheel. While not to be interpreted as a limitation, a ratio of 10 to 1 has been found to be acceptable. By this technique, both spots imaged on angle detector 36 are modulated, and the system will be inherently free of zero drifts. In its compensation mode, detector 36 operates by detecting both incident spots, the spots being modulated by electronics associated with the detector. The modulated signals are then electrically demodulated into two analog signals, corresponding to the two spots. Each signal has a magnitude proportional to its angular position on the surface of detector 36. The signals are then coupled to a comparator which generates a difference signal (the error signal referred to above) which is then reduced to zero by the servoloop of the present invention.

Figure 3:
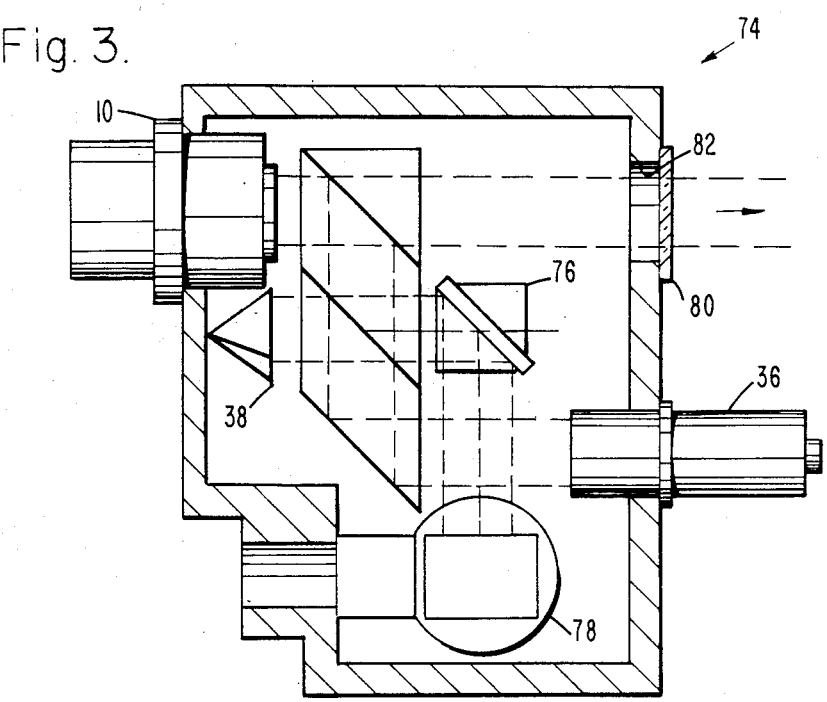
FIG. 3 is a simplified representational view illustrating a typical packaging of the gyro as a stable reference.

FIG. 3 illustrates a typical, non-optimized packaging configuration 74 for the layout down in FIG. 2. Details of the support of periscope/beamsplitter 30 and corner cube 38 have been omitted for clarity. Single, two-axis beam steering mirror 34 is replaced with two galvonometers 76 and 78 for packaging convenience. Laser 32 and modulator 40 are mounted external to configuration 74, to which optical access is provided by an output window 80 and aperture 82. For comparison purposes, the configuration shown in FIG. 3 has approximately 4% the volume and 10% the weight (on the basis of the platform volume and weight) of a typical prior art stabilized inertial reference platform. When the electronics required to drive the present platform are included and compared against those of the present invention, the comparison becomes even more favorable. This characteristic of smaller weight and volume permit use of the inventive stabilized reference beam line-of-sight autoalignment concept for applications which previously have not been practical. To provide maximum efficiency, the preferred diameter of the rotor is the same as that of the desired autoalignment beam. This requirement is easily satisfied, because of the general availability of two degree of freedom gyros with rotor sizes which match the autoalignment reference beams used in high precision pointing and tracking systems.

An important feature is that periscope 30 does not have to be accurate. Flexible body modes, which misalign the two beam splitting surfaces, can be permitted since adjustment of steering mirror 34 of FIG. 2 eliminates the misalignment.

Figure 4:
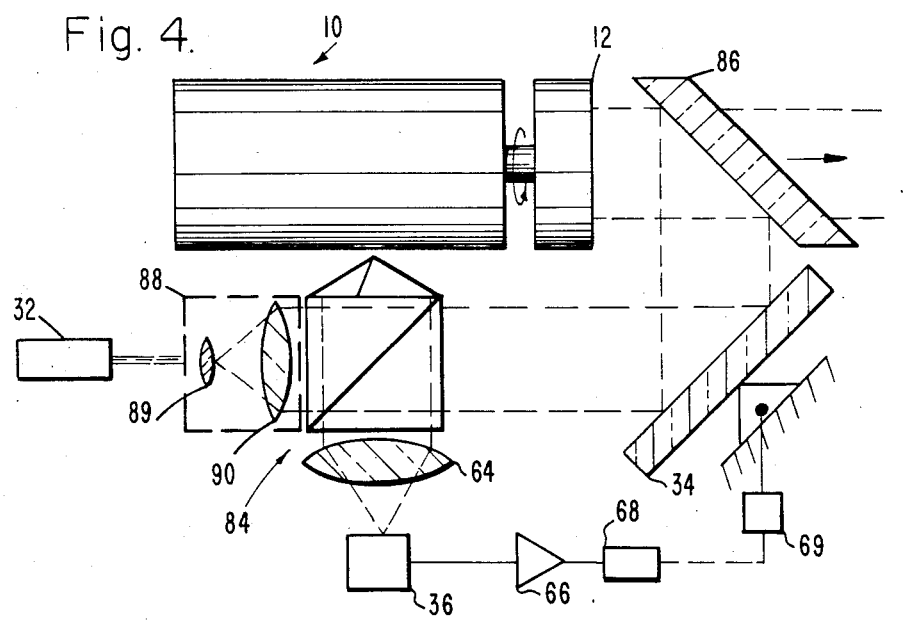
FIG. 4 is a modification of the optical schematic shown in FIG. 2.

To illustrate the insensitivity of the system to misalignment of its components, FIG. 4 shows an alternative arrangement in which a flat plate beam splitter 86 and a cube beamsplitter 84 replace the beamsplitter periscope shown in the previous figures. This embodiment of the concept is typically used when the components must be separated by large distances, thus making the periscope impractical. Alternatively, the arrangement shown in FIG. 4 is desirable when beamsplitter 86 might typically be the output window of the viewing system (as addressed in FIG. 6 following) and insertion of beamsplitter periscope would add undesirable weight and volume to the system. A beam expander 88, composed of lenses 89 and 90, is used to expand the small diameter laser beam (typically 1–1.5 mm) up to the diameter of the gyro's rotor (typically 25 mm). The specific implementation chosen depends on such factors as packaging convenience and availability of components.

Figure 5A:
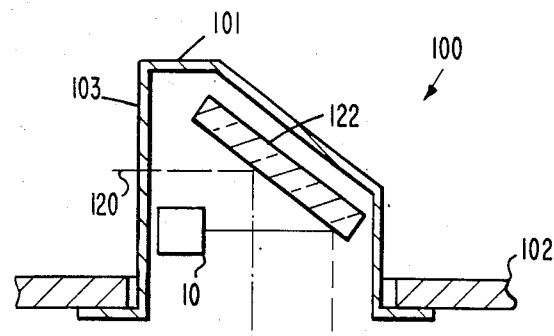
Figure 5A:
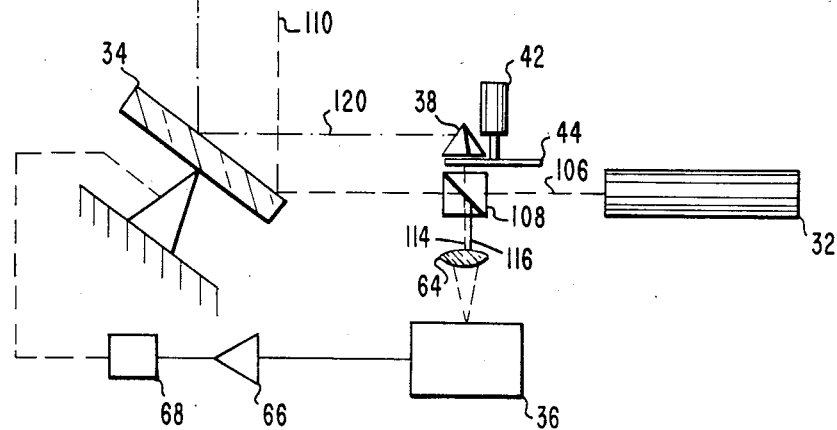

FIG. 5a illustrates the implementation of the autoalignment beam concept for stabilizing the line-of-sight for a tank stabilized head mount unit 100 (called a SHMU). A turret 101 is mounted to a tank body portion 102 in a conventional manner. An output window 103 is provided in head unit 100 as illustrated.

Figure 5B:
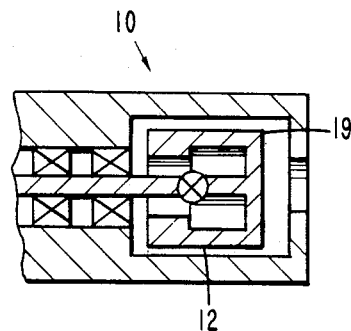

Source laser 32 generates a reference beam 106 which passes through beamsplitter 108 (or a periscope beamsplitter of the type shown in FIG. 2). A portion 110 of the laser beam exits the beamsplitter 108 on-axis and travels through the system optical path as illustrated. At the end of the optical path, beam 110 is incident (see also FIG. 5b) on flat 19 on rotor 12 of gyro 10, and is reflected back through the optical path and is split into two beams by beamsplitter 108. One split beam 114 is detected by angle detector 36. The other portion of beam 106 from source laser 32 is split off by beam-splitter 108 to corner cube 38 as beam 116, which returns it in the same direction that it entered notwithstanding the angle of incidence. Returned beam 116 is sent through beamsplitter 108 also to be imaged to a spot on detector 36 by lens 64. The two spots thus imaged on detector 36 are compared. If the spots are not superimposed, detector 36 generates an error signal as set forth hereinabove, to steering mirror 34 via servoamplifier 68 which forces the spots to become coincident. Coincidence of the spots means that laser beam 110, and hence the optical line-of-sight represented by numeral 120, are stabilized normal to the surface of rotor 12. This surface is as stable as the overall stability of the rotor of the gyro, which is, in fact, the reference for any inertial platform. Hence, the laser output beam and output line-of-sight beam 120 exiting turret 101 through half angle mirror 122 will also be that stable. Typically, this will be in the neighborhood of 5 microradians or better for a typical small, low-cost gyro such as is commonly used on inexpensive missile stable platforms. This degree of stabilization represents better than an order of magnitude performance over those conventional devices which attempt to stabilize half angle mirror 122 using such a gyro. At the same time, it should be possible to achieve such stabilization with a parts cost less than half that of a conventional device.

The viewing system may be either part of angle sensor 36 or a separate viewer band mounted to the angle sensor. In the case of a separate viewing system, an additional beamsplitter between beamsplitter 108 and angle sensor 36 would be required.

Figure 6:
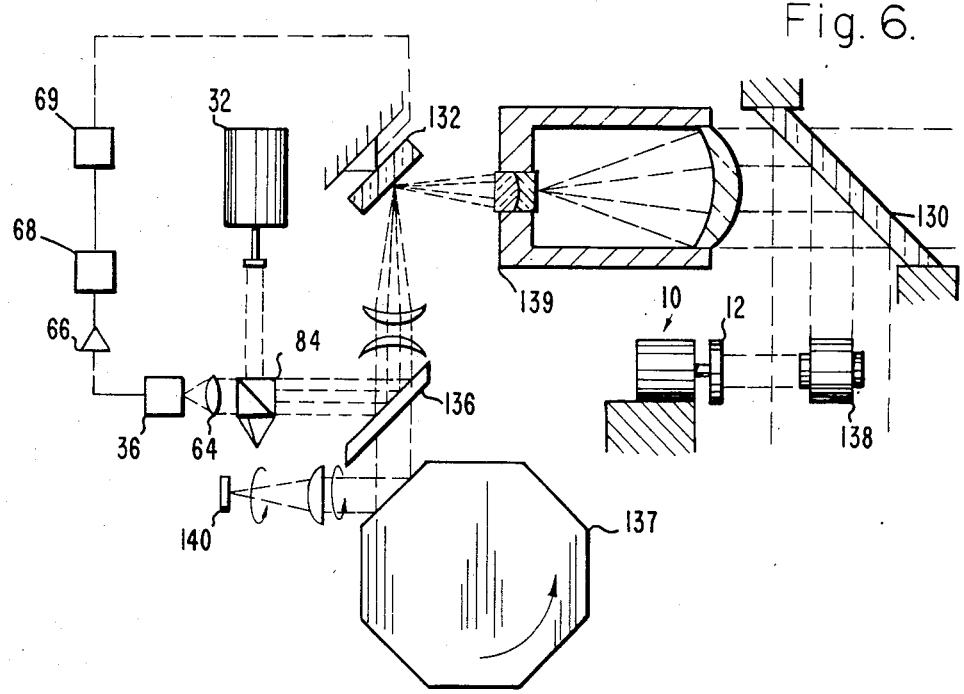
FIG. 6 illustrates the stabilization of a FLIR (forward looking infrared) system line-of-sight utilizing the principles of the present invention.

A second implementation of the autoalignment concept is shown in FIG. 6. This application stabilizes the line-of-sight of a forward looking infrared (FLIR) type device. Typically, this might be a helicopter mounted FLIR. An output window 130 of the FLIR is used, in this embodiment, as one of the three corners of a corner cube. By doing this, the output window of the FLIR can be used to sample the reference beam, and the gyro can be packaged inside the FLIR casing to achieve lower overall packaging volume. The small packaging volume of the present invention makes such closed loop line-of-sight stabilization of the FLIR practical. A conventional autoalignment platform would be impractical for such application.

Use of the instant invention for FLIR image stabilization, as shown in FIG. 6, provides benefits above and beyond those of improved image quality. The first is that image motion compensation mirror 132, commonly used in high quality FLIRS, is presently operated open loop and receives its signals from a gyro mounted on the FLIR platform. Since mirror 132, in a conventional FLIR operates open loop, the positional accuracy of the mirror, as a function of drive voltage, must be quite high. A typical, two-axis mirror 132 having bandwidth, position feedback, and the required servo loops is quite expensive and the electronics required to operate it consume undesirable volume and electrical power. With the present invention, a much lower quality mirror 132 can be used since the mirror is now inside the autoalignment loop. Position transducers can be much less accurate and need only to generate the signals required to stabilize the mirror motion. The accuracy and quality of the flexures which support the mirror can be reduced. Different mirror concepts, such as a pair of single axis galvonometers or ultra low cost piezoelectric bimorph mirrors, can be used instead of mirror 132.

Output window 130 is used as one of the three surfaces of a corner cube which returns the probe beam to angle detector 36 of the autoalignment system. The gyro of the instant invention is different from the gyros usually used to stabilize the FLIR platform. It is comparable in cost, however, and its rotor-to-case pickoff signals are used to stabilize the FLIR platform in a manner identical to that previously used with the conventional gyros. The standard FLIR device is modified by the addition of laser source 32, a beamsplitter 136, an angle detector system (lens 64 and detector 36), a beamsplitter corner cube 84, and a pair of reflecting surfaces 138. The laser source comprises a HeNe laser operating at the IR wavelength of 3.391 μm. Beamsplitter 136, mounted just before a FLIR scan mirror 137, inserts the laser probe beam into the FLIR's system optical path, and samples the beam when it is returned from gyro 12. Two additional reflecting surfaces 138 mounted close to output window 130, all at right angles to one another, complete the sampling corner cube. Gyro 10, as mentioned previously, represents a zero cost change rather than an addition to the hardware, while mirror 132 and the mirror electronics will be lower in cost than the hardware which is normally used in most high precision FLIRS.

In operation, laser 32 generates a beam which is incident on beamsplitter corner cube 84 which, in turn, directs a portion of the incident beam to beamsplitter 136. One-half of the beam from beamsplitter 136 is directed by the existing FLIR components, including mirror 132 and telescope 139, onto output window 130. Window 130, in combination with the two mirrors 138, reflects the beam onto gyro rotor 12 in the same direction that it exited telescope 139. The reflected laser light beam, interposed in the optical path with the reflected infrared entering window 130, is directed back to beamsplitter 136 and, from there, onto detector 36 in the manner described previously. Appropriate error signals are generated and coupled to mirror 132 via the previously described servo loop in a manner such that a stabilized FLIR line-of-sight is provided. Although not shown in the optical schematic, it is preferred that the angle detector combination (lens 64 and photosensor 36) be rigidly mounted to FLIR sensor 140.

The reference gyro may be mounted outside window 130 instead of mounting it inside the FLIR structure. This relieves FLIR window 130 of the requirement from sampling the probe beam output. The penalty, however, is an increased volume of the equipment.

Figure 7:
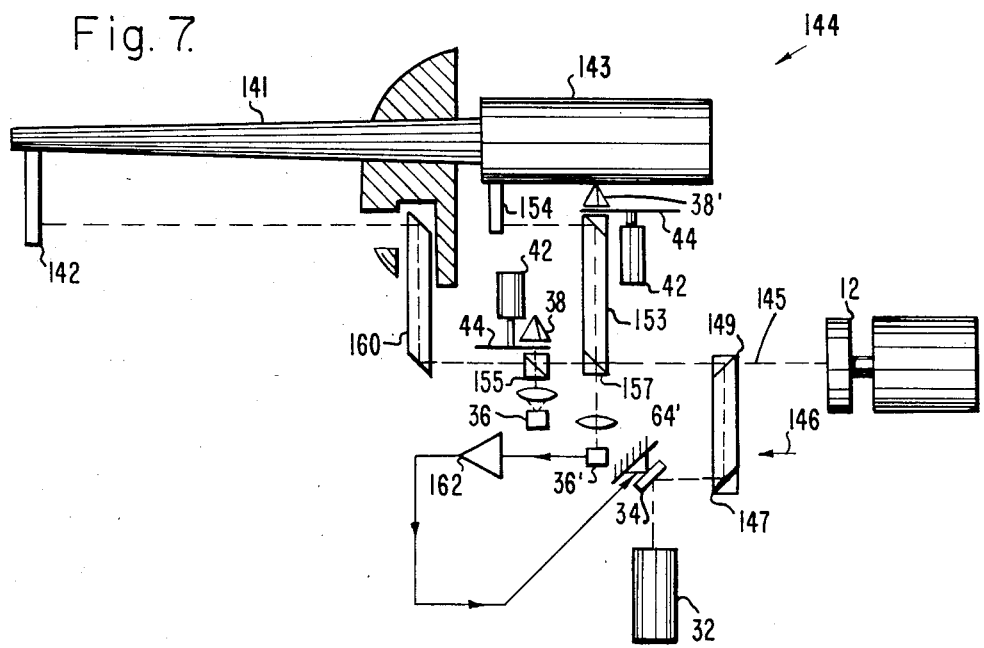
FIG. 7 is a simplified representation of the present invention utilized to provide a stabilized line-of-sight for a gun.

Further implementation of the autoalignment concept of the present invention is shown in FIG. 7 in a gun 144 having a barrel 141 and a breach 143. The pointing direction of the end of gun barrel 141 is detected and compared to the stable pointing angle of the gyro rotor. Such deflection and comparison is frequently required to correct the ill-defined direction of such large gun barrels, as those used in tanks and howitzers, or of rapidly firing medium caliber guns as used for anti-aircraft fire. For example, solar heating, wind cooling, deflection due to vehicle motion, and heating resulting from the firing of a number of rounds individually or in combination bend a gun barrel from its axis and thus often reduce the accuracy of the firings barrel to unacceptable values. By mounting a flat 142 on the end of gun barrel 141, its pointing angle can be detected and corrected to compensate for such environmental effects.

The arrangement shown in FIG. 7 provides on-axis sighting of reference flat 142 using the previously described principles of the present invention. Furthermore, the same system optical path makes a second sighting on breech 143 of gun 144 so that a first order estimate of the curvature of the barrel can be made. The accuracy of this concept is in the order of 20–50 microradians and represents approximately one to one-and-one-half orders of magnitude improvement over present sighting accuracies under adverse environmental conditions. An alignment beam 145 is transferred by a combination of the following described optical elements.

Laser 32 generates a beam which is incident on beam steering mirror 34, which directs the beam to a beamsplitter 147 in a periscope/beamsplitter 146. The split beam travels upward to another beamsplitter 149. One-half of this beam is incident on the reflecting surface of gyro rotor 12 and is reflected back through beamsplitter 149 to a beamsplitter 157 of a periscope/beamsplitter 153. One-half of this beam is directed upward and is reflected to mirror flat 154 mounted on breech 143 of gun 144 and is re-reflected through periscope/beamsplitter 153 and a lens 64' to a detector 36'. The other half of the beam not reflected in beam-splitter 153 passes therethrough to beamsplitter 155. One-half of that beam passes through beamsplitter 155, and is directed to and translated by periscope 160 for incidency on mirror flat 142. This beam is reflected back from flat 142 by periscope 160 to beamsplitter 155 and thence to a first angle detector 36 through a lens 64.

A portion of the previously mentioned outgoing laser beam incident on beamsplitter 155, which was not directed to periscope 160, is reflected back from corner cube 38 through modulating wheel 44 to provide the second spot imaged on detector 36. Detector 36 generates an error signal in response to two incident spots which drives a servoamplifier 162 to control beam steering mirror 34 in the manner described hereinabove. By so doing, the outgoing reference beam is maintained normal to the gyro rotor's surface and hence maintained stable.

As explained above, the beam returned from flat 154 on breach 143 is imaged to a second angle detector 36' through periscope/beamsplitter 153 and lens 64'. Angle detector 36' operates to generate a signal representing the angular position of the beam reflected from flat 154 with respect to the electrical null on angle detector 36'. Thus, the two angular positions of the mirror flats 142 and 154 are compared. The difference in signals generated as a result of the comparison is evaluated by conventional computing apparatus to provide an indication of barrel misalignment.

While the invention has been described with reference to its preferred embodiments, it will be understood by those skilled in the art that various changes may be made and equivalents substituted without departing from the true spirit and scope of the invention. In addition, many modifications may be made to adapt a particular situation or materials to the teachings of the invention without departing from its essential teachings.

What is claimed is:

1. A two-axis optical inertial reference system for providing a stabilized optical reference comprising:
    a two degree of freedom gyro having a gyro rotor;
    means for allowing optical access to said gyro rotor;
    means including an electromagnetic energy source for providing a beam of electromagnetic energy and for directing the beam in an optical path to a reflective surface on said gyro rotor and at an angle such that the energy reflected therefrom is substantially normal to said surface and constitutes a stabilized reference beam;
    an adjustable beam steering mirror interposed in the optical path between said source and said gyro for directing said electromagnetic energy beam onto said gyro rotor;
    means for adjusting said mirror to compensate for changes in position of said gyro rotor such that said beam is reflected substantially normal from said gyro rotor surface, and including an angle detector responsive to the angular position of the reflected beam from said gyro rotor, said angle detector generating an error signal in a first operative mode which is proportional to the difference between an electrical null position on said angle detector and the angular position of said reflected beam; and
    a corner cube positioned in the optical path before said gyro rotor for receiving a portion of said beam, said corner cube returning the beam incident thereon to said angle detector at an angle representing the misalignment of the beam reflected from said gyro rotor surface due to movement of any of the components, which comprise said system, other than said gyro rotor.

2. The system of claim 1 wherein the beam returned from said corner cube and a portion of the beam reflected from said gyro rotor surface are incident on said angle detector.

3. The system of claim 2 wherein said angle detector generates an error signal in a second mode of operation proportional to the difference in angular positions between said incident beams, said servo loop being responsive to said error signal to position said beam steering mirror such that said two beams are co-aligned indicating that the reference beam reflected from said gyro rotor surface is normal thereto.

4. The system of claim 1 including means for modulating the beam returned from said corner cube at a first frequency.

5. The system of claim 4 wherein said source beam is modulated at a second frequency.

6. The system of claim 5 wherein said second frequency is greater than said first frequency.

7. A two-axis optical inertial reference system for providing a stabilized optical reference comprising:
    a gyroscope having a rotor with a reflective surface thereon;
    means gimballing said rotor in two axes normal to its spin axis;
    means including an adjustable beam steering mirror for directing a beam of electromagnetic energy in an optical path to said reflective surface and for reflecting the energy therefrom as a stabilized reference beam;
    means for adjusting said mirror to compensate for any changes in position of said rotor such that said beam is reflected at a desired angle from said rotor surface; and
    means positioned in the optical path for returning a portion of the beam incident thereon to said adjusting means at an angle representing any misalignment of the beam reflected from said rotor surface due to movement of any of the components, other than said rotor.

8. The system of claim 7 wherein said gyro rotor is provided as a stable reference flat and further including means including a source of the electromagnetic energy beam to provide an autoalignment beam for reflection from said reference flat.

9. The system as defined in claim 7 wherein said system is incorporated in a FLIR based detection system.

10. The system as defined in claim 7 wherein said system is adapted for use as a viewing system in a tank gun turret.

11. The system as defined in claim 7 wherein said system is adapted for use with a gun barrel such that the pointing direction of the end of the barrel corresponds to the pointing angle of said gyro rotor.

12. The system of claim 7 wherein the diameter of said autoalignment beam is approximately equal to the diameter of said gyro rotor.

* * * * *